United States Patent

Hallman et al.

[15] 3,637,379

[45] Jan. 25, 1972

[54] METHOD FOR MAKING A RELIEF PATTERN BY MEANS OF ELECTROMAGNETIC RADIATION AND HEAT-SENSITIVE ELEMENTS

[72] Inventors: Robert W. Hallman, Utica; Gary W. Kurtz, Southfield, both of Mich.

[73] Assignee: Teeg Research, Inc., Detroit, Mich.

[22] Filed: July 30, 1969

[21] Appl. No.: 846,212

Related U.S. Application Data

[63] Continuation-in-part of Ser. No. 647,525, June 20, 1967, abandoned.

[52] U.S. Cl. ....................................96/36, 96/36, 96/36.2, 96/36.3, 96/86, 96/88, 117/36.8, 117/36.9, 117/217, 250/65 R, 250/65.1, 204/157.1 R, 156/3, 156/4, 156/17, 156/18

[51] Int. Cl. ....................................G03c 5/00, G03c 1/72

[58] Field of Search................96/1.5, 27, 35, 36, 36.2, 36.3, 96/86, 88; 252/501; 117/36.8, 36.9, 93.3, 217; 250/65.1; 204/157.1; 29/195; 156/3, 4, 17, 18

[56] References Cited

UNITED STATES PATENTS

| | | | |
|---|---|---|---|
| 3,122,463 | 2/1964 | Ligenza et al. | 156/4 |
| 3,271,180 | 9/1966 | White | 117/93.3 X |
| 3,346,384 | 10/1966 | Gaynor | 96/36 |
| 3,377,169 | 4/1968 | Blake | 96/88 |
| 3,386,823 | 6/1968 | Keller et al. | 96/27 |
| 3,440,046 | 4/1969 | Droege et al. | 96/27 |

FOREIGN PATENTS OR APPLICATIONS

| | | | |
|---|---|---|---|
| 344,354 | 3/1931 | Great Britain | |
| 968,141 | 8/1964 | Great Britain | |
| 1,151,310 | 9/1969 | Great Britain | |
| 1,035,892 | 7/1966 | Great Britain | 96/1.5 |

OTHER PUBLICATIONS

Kostyshin et al., " Photographic-Sensitivity Effect in Thin Semiconducting Films on Metal Substrates," Soviet Physics–Solid State, Vol. 8, No. 2, Feb. 1966, pp. 451–452

*Primary Examiner*—George F. Lesmes
*Assistant Examiner*—R. E. Martin
*Attorney*—Hauke, Gifford and Patalidis

[57] ABSTRACT

Methods for making a metallic relief pattern article by irradiating, according to the pattern to be reproduced, a radiation and heat sensitive element comprising essentially a layer of metal coated with an adhering overlayer of an inorganic material capable of interreacting with the metal when either exposed to electromagnetic radiation or exposed to heat. After exposure to electromagnetic radiation which causes a reduction in adhesion between the overlayer and the layer of metal, the element is stripped of the portions of the overlayer corresponding to the irradiated areas and is subsequently heated for causing an interreaction between the remaining portions of the overlayer and the layer of metal, consuming in depth and thus etching the metal of the layer of metal.

10 Claims, 10 Drawing Figures

PATENTED JAN 25 1972 3,637,379
FIG. 1
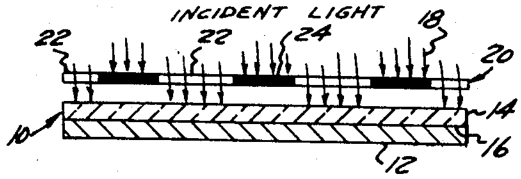
FIG. 7
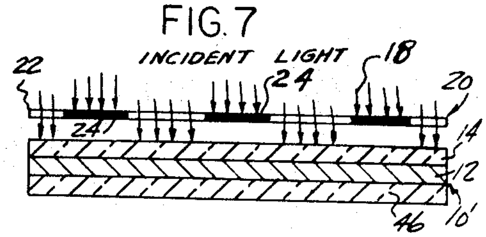
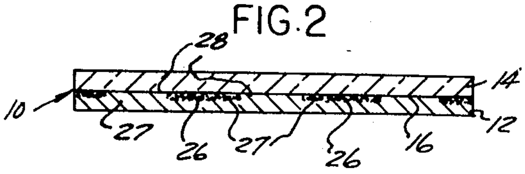
FIG. 8
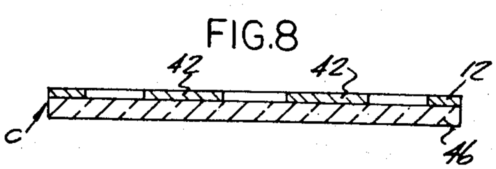
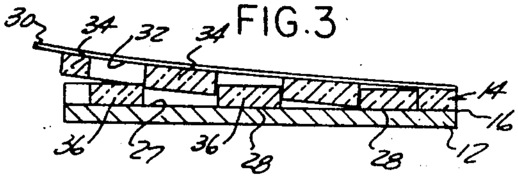
FIG. 9
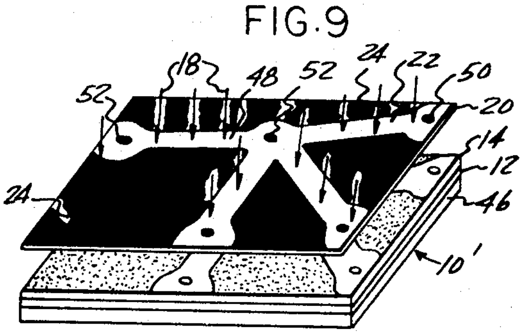
FIG. 4
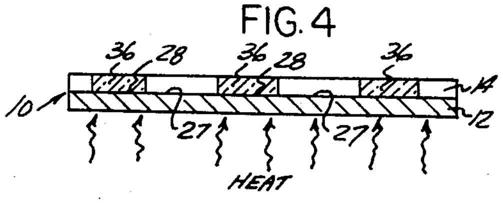
FIG. 5
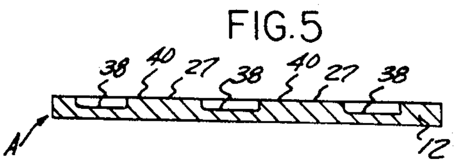
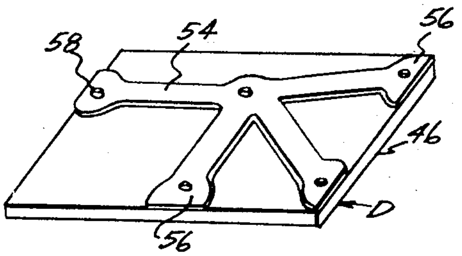
FIG. 10
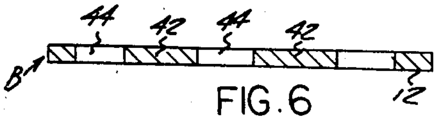
INVENTORS
ROBERT W. HALLMAN
GARY W. KURTZ
By Hauke, Gifford & Patalidis
ATTORNEYS

METHOD FOR MAKING A RELIEF PATTERN BY MEANS OF ELECTROMAGNETIC RADIATION AND HEAT-SENSITIVE ELEMENTS

CROSS-REFERENCE TO RELATED APPLICATIONS

The present application is a continuation-in-part of application, Ser. No. 647,525, filed June 20, 1967, now abandoned and is copending with applications, Ser. Nos. 839,038, filed July 3, 1969, 841,416, filed July 14, 1969 and 841,718, filed July 15, 1969.

BACKGROUND OF THE INVENTION

In copending application, Ser. No. 839,038, and in the other copending applications enumerated above, there are disclosed electromagnetic radiation sensitive elements which typically consist of a metallic or a layer of silicon, therein and hereinafter referred to as a "metallic layer" which, for some applications, may be provided with a support member or substrate and which is coated with an adhering overlayer of an inorganic material capable of interreacting with the metallic layer when exposed to incident electromagnetic actinic radiation, such as, for example, intense white light and the like. As particularly disclosed in copending application, Ser. No. 841,718, the formation of an interreaction product, as a result of such exposure to electromagnetic radiation, at the boundary or interface between the metallic layer and the overlayer results in a considerable reduction of the force of adhesion between the overlayer and the metallic layer. Portions of the overlayer corresponding to the irradiated areas may be stripped from the metallic layer by mechanical means such as engaging with the outer surface of the overlayer a member coated with an adhesive forming with the overlayer surface a stronger bond than the reduced adhesion bond between the overlayer and the metallic layer at such irradiated areas. The methods of the present invention provide for stripping a radiation sensitive element after selective and discrete exposure to electromagnetic actinic radiation causing such reduction in bond adhesion between the overlayer and the metallic layer, followed by a heat-provoked interreaction between the remaining portions of the overlayer and the metal or silicon of the metallic layer at the areas remaining covered by such remaining portions of the overlayer. The heat-provoked interreaction causes an etching in depth of the metallic layer in a pattern corresponding to the original pattern projected on the radiation-sensitive element and, if the metallic layer is sufficiently thin, there is caused a complete etching in depth of the metallic layer according to the appropriate pattern and irrespective of the geometric configuration of such pattern.

BRIEF DESCRIPTION OF THE DRAWINGS

In the accompanying drawings, wherein like reference numerals refer to like or equivalent parts:

FIG. 1 is a schematic representation, in section, of an electromagnetic radiation sensitive element according to the present invention, in the process of being exposed to incident electromagnetic actinic radiation in a predetermined pattern;

FIG. 2 is a schematic representation, in section, of the electromagnetic radiation-sensitive element of FIG. 1, after exposure to electromagnetic actinic radiation;

FIG. 3 is a schematic representation, in section of the electromagnetic radiation-sensitive element of FIG. 2 in the process of being stripped of portions of its overlayer corresponding to the areas precedently exposed to electromagnetic actinic radiation;

FIG. 4 is a schematic representation, in section, of the stripped electromagnetic radiation-sensitive element in the process of being exposed to heat;

FIG. 5 is a schematic representation, in section, of a first form of finished article;

FIG. 6 is a view similar to FIG. 5, but showing a modification of the finished article;

FIG. 7 is a schematic view substantially alike FIG. 1, but showing an electromagnetic radiation sensitive element of a modified structure;

FIG. 8 is a schematic view in section of a finished article obtained by means of the electromagnetic radiation-sensitive element of FIG. 7;

FIG. 9 is a schematic perspective view of a typical electromagnetic radiation-sensitive element in the process of being exposed to an electromagnetic actinic radiation pattern for the purpose of obtaining, for example, a printed electrical circuit or the like as a finished article; and FIG. 10 is a schematic perspective view of a finished article, such as a printed electrical circuit, obtained by way of the arrangement of FIG. 9.

DETAILED DESCRIPTION OF THE PREFERRED EMBODIMENTS

At FIG. 1, there is schematically shown in section an electromagnetic radiation-sensitive element 10 consisting essentially of a metallic layer 12, as defined hereinafter provided with an adhering overlayer 14 of an inorganic material capable of interreacting with the metallic layer 12 when exposed to electromagnetic actinic radiation such as light radiation. At FIG. 7, there is schematically shown in section at 10' a modification of the electromagnetic radiation sensitive element 10 of FIG. 1 which further comprises a support member or substrate 46 made of any convenient material such as glass, a plastic, a metal such as aluminum or magnesium, and the like.

A list of elements particularly suitable for the metallic layer 12 includes silver, copper, lead, cadmium, zinc, iron, tin, arsenic, bismuth, cobalt, germanium, indium, manganese, mercury, nickel, selenium, silicon, tellurium, thallium, and vanadium. Such metallic layer is in the form of a thin foil, FIG. 1, or a thin foil or coating on the substrate 46, FIG. 8, of a thickness that may vary, according to the purpose to be accomplished and according to the proposed use of the sensitive element, from a few atom layers to a fraction of a mil or even to several mils. When using a very thin metallic layer 12 which is substantially "transparent," i.e., which has substantially good transmissivity to the actinic radiation, the sensitive element may be exposed, in addition to the manner hereinafter explained, by causing the incident actinic radiation to impinge upon the surface of the metallic layer or of the substrate, as well as causing the radiation to impinge upon the surface of the overlayer 14, as long as the substrate is also "transparent" to the radiation.

By "metallic layer" is meant herein a layer containing silicon or any one of the common metals hereinbefore mentioned, either alone, or alloyed to another common metal, or in the form of a metallic mixture. Consequently, the term "-metallic layer" as used herein and in the appended claims means a material containing at least silicon or one metal in the form hereinbefore indicated.

The overlayer 14 is also substantially thin, of the order of a few atom layers to several microns, or even a few mils, and it may consist of any one of a variety of ternary and binary inorganic materials and compounds and any one of a few elements. An example of ternary material, which has been found to be particularly suitable, is a glassy material consisting of arsenic, sulfur and iodine for example in the following proportions: arsenic—40 percent by weight, sulfur—50 percent by weight and iodine—10 percent by weight, although the proportion of iodine may be within the range of 1 to 30 percent by weight. Appropriate examples of such ternary materials are given in U.S. Pat. No. 3,024,119, issued Mar. 6, 1962. Chlorine, bromine, selenium, thallium or tellurium may be substituted for iodine.

A multitude of binary compounds and mixture have been found to be useful for the inorganic material of the overlayer 14. Examples of such binary compounds or mixture comprise halides of metals, such as copper, antimony, arsenic, sulfur, thallium, lead, cadmium and silver, and sulfides, arsenides, selenides and tellurides of such metals. The most suitable materials, presenting substantial actinic sensitivity when deposited on a metallic layer of copper, silver, lead, zinc, etc., for example are arsenic-sulfur mixtures and compounds, antimony-sulfur compounds and mixtures, silver-sulfur compounds and mixtures, bismuth-sulfur compounds and mixtures, chromium-sulfur compounds and mixtures, lead iodide, copper chloride, stannous chloride, mercury chloride, arsenic selenides, selenium-sulfur compounds and mixtures, chromium selenides and indium-sulfur compounds and mixtures. Is seems that the property of reacting with a metallic layer, as defined herein, under the influence of electromagnetic actinic radiation is shared by a variety of mixtures and compounds, having such property to varying but generally useful degrees. Such binary compounds and mixtures may be generally cataloged as consisting of a metal halide or a mixture of a metal with a halogen, metal selenide or a mixture of a metal with selenium, metal sulfide or a mixture of a metal with sulfur, and metal telluride or a mixture of a metal with tellurium. Stoichiometric proportions are not critical, but it is preferable that the resulting material be substantially transparent to electromagnetic actinic radiations of an appropriate wavelength, specially when the overlayer is substantially thick.

Single elements, such a halogens, are also capable of reacting with a metallic layer when exposed to electromagnetic actinic radiation.

A general grouping of inorganic materials suitable for forming an actinically reactive overlayer when disposed on a metallic layer therefore consists of halogens, sulfur, selenium, M–X compounds and mixtures and M–X–Y compounds and mixtures, wherein M is a metal and X and Y are selected from the group consisting of a halogen, sulfur, selenium and tellurium; the metal M in the compounds and mixtures is selected from the group consisting of arsenic, antimony, bismuth, selenium, tellurium, copper, zinc, cadmium, mercury, lead, chromium, gallium, indium, thallium, germanium, tin, iron, cobalt, nickel and silver.

A particularly suitable binary material presenting substantial sensitivity when deposited on a layer of silver, copper, cadmium, lead, zinc or other metal is an arsenic-sulfur compound or mixture in a glassy or vitreous form and which presents remarkably good radiation transmissivity from the infrared to the ultraviolet region of the electromagnetic spectrum. The proportions of arsenic and sulfur may be any adequate proportion which permit to obtain a vitreous material, such proportions preferably ranging from about 40 percent arsenic–60 percent sulfur by weight to 70 percent arsenic–30 percent sulfur by weight.

In copending application, Ser. No. 839,038, there is disclosed several examples of preparation of electromagnetic radiation sensitive elements according to the invention. Elements such as element 10' of FIG. 7 herein may be prepared typically as follows:

A plate of aluminum constituting the substrate 46 of any appropriate dimension, one or two mils thick, is placed in a bell jar evacuated at about 0.5 micron pressure. Silver metal is evaporated from tungsten electrical resistance heaters brought to about 1,100° C. by the passage of electrical current therethrough, a silver coating or ribbon being disposed on the tungsten filament. By evaporating the silver for about 3 seconds, a silver layer 12 on the aluminum substrate 46 is obtained, having a thickness of about 4,000 A. Longer evaporation times provide proportionally thicker silver layers. For example, 15 to 20 seconds evaporation time provides silver layers on the substrate having a thickness of approximately 1 micron. The thickness of the thin film or layer 12 of silver can be continuously monitored by means of a thickness monitor.

As previously mentioned, other metals may be used to form the substrate 46, or nonmetallic materials such as a glass or a plastic, or the like, may be used instead of a metallic substrate.

Vapor deposition techniques may also be used for deposition on the top of the metallic layer 12 an overlayer 14 of any of the inorganic materials hereinbefore listed. Alternately, if the element 10 of FIG. 1, without substrate, is desired to be obtained, the starting structure consists of a metallic foil, such as, for example, a silver foil. Typically, the substrate having a superficial layer of silver thereon or the silver foil is placed in a bell jar evacuated at about 0.1 micron pressure. A quartz crucible is placed in the bell jar in an electrical resistance heater and is loaded with pieces of the inorganic material, such as for example arsenic trisulfide, $As_2S_3$. The surface of the silver layer or foil is typically located at a distance of about 6 inches away from the quartz crucible. The arsenic trisulfide is heated in the crucible to about 350° to 400° C., and a thin film of arsenic trisulfide, forming the overlayer, is deposited on the surface of the silver layer or foil by evaporating the arsenic trisulfide from the quartz crucible for about 30 to 40 seconds, thus providing a thickness of the overlayer of approximately 1 micron. Longer deposition times provide greater thickness of the overlayer, while shorter deposition times provide proportionally thinner overlayers.

Any one of the herein mentioned inorganic materials may be substituted for the arsenic trisulfide, and other techniques may be used for depositing the overlayer upon the metallic layer. For example, the inorganic material may be dissolved in an appropriate solvent and painted or sprayed over the surface of the metallic layer, or cathode sputtering and other techniques may be used with equal success.

In order to practice the method of the present invention, the electromagnetic radiation-sensitive element 10 of FIG. 1 is exposed to incident electromagnetic actinic radiation, such as light, as shown by arrows 18 impinging on the radiation-sensitive element in a predetermined pattern. Such selective and discrete exposure of the radiation-sensitive element may be accomplished, for example, by exposing the electromagnetic radiation-sensitive element 10 to such incident light through a mask 20 having portions 22 substantially transmissive of the light and other portions 24 substantially nontransmissive of the light. It is obvious that other means than mask 20 may be used for exposing the electromagnetic radiation element 10 to incident light for permitting such light to impinge upon the element in a selective and discrete manner, such as by projection thereon of a predetermined pattern by means of any well-known image-projection systems. Generally an exposure of several seconds to a 30 to 100 watts incandescent lamp is sufficient for the purpose to be accomplished.

Under the influence of such selective and discrete irradiation of the radiation sensitive element 10, there is caused at the boundary or interface 16 between the metallic layer 12 and the overlayer 14 an interreaction causing the formation of an interreaction product such as shown at 26 in FIG. 2, at the areas 27 of such boundary or interface corresponding to the areas subjected to illumination during exposure, while the other areas of the boundary or interface, as shown at 28, which were protected from illumination by the nontransmissive portions 24 of mask 20, are left undisturbed.

The irradiated boundary areas 27, as a result of the formation of the interreaction product 26, form portions of the interface between the overlayer 14 and the metallic layer 12 having reduced adhesion and permitting the overlayer 14 to be stripped, selectively and discretely, from the metallic layer 12 at such irradiated areas. The stripping may be effected by any appropriate mechanical means such as flexing or bending of the element or by thermal shock of the element, either one of which causes the portions of the overlayer 14 corresponding to the boundary areas 24 to separate from the metallic layer 12. However, stripping is preferably effected by means of a pliable sheet member 30, FIG. 3, provided on a face 32 thereof with a coating of adhesive forming a substantially strong bond with the outer surface of overlayer 14. The force of adhesion between the pliable member 30 and the outer surface of the overlayer 14 is however less than the normal force of adhesion between the overlayer 14 and the metallic layer 12 at the areas 28 having not been subjected to irradiation. Consequently, when the pliable member 30 is pulled back as shown at FIG. 3, it removes by peeling discrete portions 34 of the substantially brittle overlayer 14 that correspond to the irradiated areas 27 of the radiation-sensitive element and which neatly separate from the portions 36 of the overlayer, corresponding to the nonirradiated areas 28 of the boundary or interface 16. Utilizing a radiation-sensitive element 10 made of a silver metallic layer 12 provided with an overlayer 14 made of arsenic-sulfur vacuum deposited thereon, the adhesive coated pliable member 30 may simply consist of a piece of conventional commercially available pressure-sensitive tape.

The exposed and stripped electromagnetic radiation-sensitive element is thereafter subjected to the action of heat, as shown at FIG. 4, by being rapidly heated to a temperature high enough to cause a heat-provoked reaction between the material of the remaining portions 36 of overlayer 14 and the silicon or metal of metallic layer 12 at the boundary or interface 28 of contact therebetween. Such temperature is usually in the neighborhood of a few hundred degrees F. and the heat reaction is accomplished simply by placing the exposed and stripped element on a "hotplate" substantially alike the hotplate of an ordinary electric stove, with the metallic layer 12 in contact with the hot surface. It is obvious that the temperature at which the element is heated is preferably just below the melting point of the material of the overlayer 14. Utilizing the typical example of radiation-sensitive element, hereinbefore described, consisting of an arsenic-sulfur overlayer on silver, a temperature of about 250°–300° F. is suitable.

Under the influence of the heat being supplied to the element, the remaining portions 36 of the overlayer 14 rapidly react with the silicon or metal of the metallic layer 12 at the areas 28 of contact therebetween, causing an in-depth etch of the metallic layer at such areas of contact. The product or products formed as a result of such heat-provoked interreaction between the remaining portions of overlayer 14 with the silicon or metal of metallic layer 12 are vaporized or sublimated as soon as formed, such that the resulting article A is a metallic layer 12 provided with a relief pattern formed by recessed portions, as shown at 38 in FIG. 5, which correspond to the surface of the metallic layer 12 which have been etched as a result of the heat-provoked interreaction between the remaining portions 36 of the overlayer 14 with the metallic layer 12, and presenting substantially uniplanar projecting portions 40 corresponding to the irradiated surface portions 27 from which the overlayer was removed during the stripping operation following the exposure of the original radiation-sensitive element to light.

With a metallic layer 12 which is substantially thin, generally of the order of 1 micron or less, the heat-provoked etching of the metallic layer is caused to extend from surface to surface such that the finished article is as shown at B in FIG. 6, consisting of the metallic layer 12 provided with remaining portions 42 forming an appropriate metallic pattern by contrast with the perforations 44 resulting from the surface-to-surface etching of the metallic layer 12.

The modified electromagnetic radiation-sensitive element 10′ shown schematically in section in FIG. 7, is as previously mentioned, substantially alike the element 10 of FIG. 1, i.e., comprising a metallic layer 12, as defined herein, provided with an adhering overlayer 14. However, the metallic layer 12 is provided on its remaining free face with a support member or substrate 46 made of any convenient material, such that, after exposure to incident actinic radiation such as light through an appropriate mask 20, and after stripping of portions of the overlayer 14 and application of heat to the element, as previously explained, the resulting article is substantially as shown schematically at C in FIG. 8, consisting of a metallic relief pattern 42 supported by the support member or substrate 46. FIG. 8 shows at C a finished article wherein the metallic layer 12 was originally thin enough such that the heat-provoked etching of the metallic layer has been completely effected from the surface thereof in contact with the remaining portions of the overlayer all the way to the surface of the substrate 46. It is obvious that the material of the substrate 46 should preferably be such as to not to react with either the material of the overlayer 14 or the product resulting from the heat reaction between the material of such overlayer with the silicon or metal of the metallic layer 12. It is also obvious that the metallic layer 12 may be made thick enough so as not to be entirely etched from surface to surface during the heating step in the method of the invention, such that the resulting article is substantially like article A of FIG. 5 provided with an appropriate support member or substrate.

Referring now to FIG. 9 there is shown a schematic representation of an application of the present invention for the purpose of making an article provided with a metallic relief pattern, such as a printed electrical circuit. The radiation-sensitive element 10′, including the metallic layer 12 disposed on a substrate 46 made of a nonconductive material, and provided with the overlayer 14 of inorganic material is exposed to incident actinic radiation such as light 18 through a mask 20 having appropriate portions 24 nontransmissive of the light and other portions 22 substantially transmissive of the light. The combination of the several light transmissive portions of the mask forms the outline of a typical circuit pattern having conductors 48 and terminal portions 50 provided with nontransmissive small portions 52 for the purpose hereinafter indicated. After exposure to light, as shown in FIG. 9, and after subsequent stripping of the portions of overlayer 14 corresponding to the areas of the sensitive element 10′ subjected to illumination through the mask, followed by heat reaction between the remaining portions of the overlayer and the metallic layer 12, according to the method of the invention hereinbefore explained in detail, the resulting article D is a printed circuit formed by metallic conductors 54, in the pattern shown at FIG. 10, and provided with appropriate terminal portions 56 having appropriate terminal recesses 58 for connection to electrical or electronic component leads by soldering or the like. The circuit is "printed" upon the surface of the substrate 46 forming a support base therefor, and is in all respect comparable to a printed circuit obtained by conventional and more complicated methods.

An example of typical electromagnetic radiation-sensitive element 10′ as shown at FIG. 9 may consist of an epoxy resin substrate 46 provided with a metallic laminate 12 of copper about 1-mil-thick placed in adhesion thereon by any of the conventional means well known to those skilled in the art of fabrication of printed circuits. The overlayer 14 consists of an adhering layer several microns or mils thick made of arsenic-sulfur, arsenic-sulfur-iodine or any of the inorganic materials hereinbefore mentioned, vacuum deposited thereon, as herein explained in details on in copending application, Ser. No. 839,038, or deposited on the surface of the copper layer 14 by rapid dipping of the copper clad substrate in the melted inorganic material. When utilizing an arsenic-sulfur-iodine mixture for the overlayer, a mixture rich in iodine, to provide fluidity, may be used, and the iodine rich mixture is "painted" on the copper surface by brushing or spraying, followed by evaporation of the excess iodine so as to provide a solid coating on the copper surface.

Having thus described the present invention by way of examples thereof given for illustrative purpose only, what is sought to be protected by United States Letters Patent is as follows:

1. A method for making a metallic relief pattern by means of an electromagnetic radiation-sensitive element comprising a layer coated with an adhering overlayer transmissive of said electromagnetic radiation and consisting of an inorganic material different from that of said layer and capable of interreacting when exposed to electromagnetic actinic radiation with said layer so as to reduce the adhesion between said overlayer and said layer, wherein said layer is selected from the group consisting of silver, copper, lead, cadmium, zinc, iron, tin, arsenic, bismuth, cobalt, germanium, indium, manganese, mercury, nickel, selenium, silicon, tellurium, thallium, and vanadium, said inorganic material is selected from the group consisting of sulfur, selenium, M–X compounds and mixtures and M–X–Y compounds and mixtures, wherein M is a metal selected from the group consisting of arsenic, antimony, bismuth, selenium, tellurium, copper, zinc, cadmium, mercury, lead, chromium, gallium, indium, thallium, germanium, tin, iron, cobalt, nickel and silver, and X and Y are selected from the group consisting of halogen, sulfur, selenium and tellurium, said method comprising the steps of: projecting an electromagnetic radiation actinic image of the pattern to be reproduced on the radiation-sensitive element with an intensity and for a period of time sufficient to reduce the force of adhesion at predetermined areas between the overlayer and the layer where impinged by said electromagnetic actinic radiation;

removing portions of said overlayer corresponding to such areas of reduced adhesion while leaving other portions of said overlayer adhering to said layer; and heating said layer at a temperature and for a period of time sufficient for causing an interreaction between the remaining portions of said overlayer and said layer etching in depth said layer at such areas covered by said remaining portions of said overlayer.

2. The method of claim 1, wherein said layer has a dissimilar substrate.

3. The method of claim 1 wherein the step of removing said portions of the overlayer is effected by means of a member provided with an adhesive coating forming with said overlayer a bond stronger than the reduced adhesion between said overlayer and said layer, said bond being weaker than the normal force of adhesion between said overlayer and said layer.

4. The method of claim 1, wherein said layer is substantially thin so as to be completely interreacted in depth in the course of said heating at said areas covered by said remaining portions of said overlayer.

5. The method of claim 1, wherein said layer is substantially thin so as to be completely interreacted in depth in the course of said heating at said areas covered by said remaining portions of said overlayer and said substrate is incapable of reacting with said overlayer.

6. A method for making a relief pattern by means of an electromagnetic radiation-sensitive element comprising a layer coated with an adhering overlayer transmissive of said electromagnetic radiation and consisting of an inorganic material different from that of said layer and capable of interreacting when exposed to electromagnetic actinic radiation with said layer so as to reduce the adhesion between said overlayer and said layer, said layer being selected from the group consisting of silver, copper, lead, cadmium, zinc, iron, tin, arsenic, bismuth, cobalt, germanium, indium, manganese, mercury, nickel, selenium, silicon, tellurium, thallium and vanadium, and said inorganic material of said overlayer being selected from the group consisting of sulfur, selenium, M–X compounds and mixtures and M–X–Y compounds and mixtures, wherein X and Y are selected from the group consisting of halogen, sulfur, selenium and tellurium, and M is a metal selected from the group consisting of arsenic, antimony, bismuth, selenium, tellurium, copper, zinc, cadmium, mercury, lead, chromium, gallium, indium, thallium, germanium, tin, iron, cobalt, nickel and silver, said method comprising the steps of:

projecting an electromagnetic radiation actinic image of the pattern to be reproduced on the radiation-sensitive element with an intensity and for a period of time sufficient to reduce the force of adhesion at predetermined areas between the overlayer and the layer where impinged by said electromagnetic actinic radiation;

removing portions of said overlayer corresponding to such areas of reduced adhesion while leaving other portions of said overlayer adhering to said layer; and heating said layer at a temperature sufficient to cause an interreaction between the remaining portions of said overlayer and said layer to cause an etching in depth of said layer at such areas covered by said remaining portions of said overlayer and for a period of time sufficient to cause heat sublimation of the product resulting from said interreaction.

7. The method of claim 6, wherein said layer has a dissimilar substrate.

8. The method of claim 6, wherein the step of removing said portions of the overlayer is effected by means of a member provided with an adhesive coating forming with said overlayer a bond stronger than the reduced adhesion between said overlayer and said layer, said bond being weaker than the normal force of adhesion between said overlayer and said layer.

9. The method of claim 6, wherein said layer is substantially thin so as to be completely interreacted in depth in the course of said heating at said areas covered by said remaining portions of said overlayer.

10. The method of claim 7, wherein said layer is substantially thin so as to be completely interreacted in depth in the course of said heating at said areas covered by said remaining portions of said overlayer and said substrate is incapable of reacting with said overlayer.

* * * * *